Sept. 24, 1963
J. MEYERS
3,105,178
ELECTRON STORAGE AND POWER CELL
Filed Jan. 20, 1960
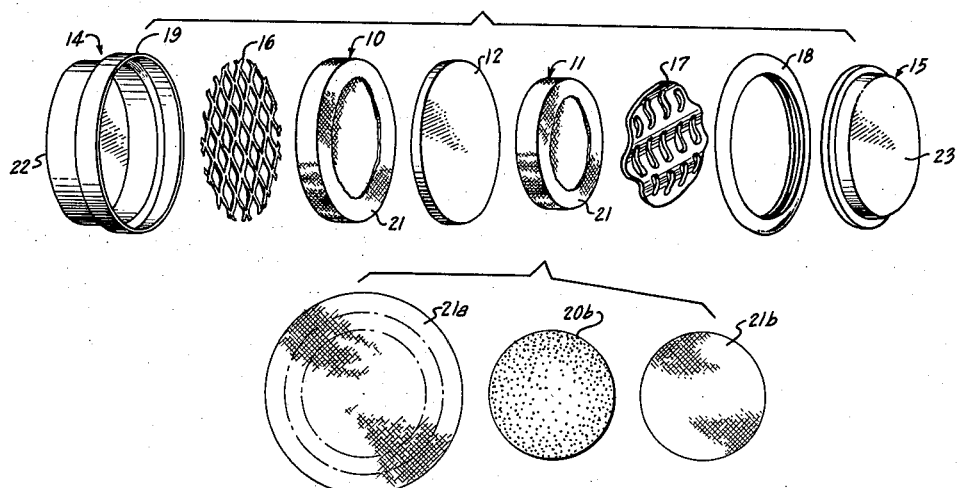
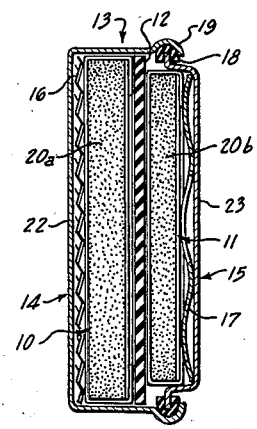
INVENTOR:
Joseph Meyers
BY
Mullin and Hanscom
ATTORNEYS 3,105,178
ELECTRON STORAGE AND POWER CELL
Joseph Meyers, 23 Alter St., Cloverdale, Calif.
Filed Jan. 20, 1960, Ser. No. 3,635
8 Claims. (Cl. 317—262)

This invention pertains to an electron storage and power cell, similar in structure to a condenser but operatively different in that the power cell herein described possesses an inherent capacity for prolonged electron emissivity.

In brief, the invention involves a unique power cell construction including a pair of plate elements separated by an insulator, one of said plate elements having a capacity for prolonged electron emissivity when negatively charged relative to the other plate element and conductively interconnected therewith. This power cell is capable of being charged from a D.C. supply, used over a considerable period of time as a direct current source, and then recharged. As would be expected, the voltage between the plate elements varies with the cell's use and, thus, the cell provides a variable voltage source. The maximum voltage to which an individual power cell may be charged is a function of the substance from which one or both plate elements are formed. Similarly, the capacitance or quantity of electricity that will be transferred from the first plate element to the other in order to create a potential difference of one volt between the plates will also be a function of the plate materials (as well as the distance between the plate elements and the nature of the insulating material therebetween).

It is a primary object of this invention to provide an electron storage and power cell comprising a first element of electron absorptive substance for collecting or emitting electrons, a second element of electron absorptive substance for collecting or emitting electrons, said second element having a capacity for prolonged electron emissivity when negatively charged relative to said first element and conductively interconnected therewith, and an electrical insulating element disposed between and separating said first and second elements.

Another object is to provide a novel construction for a power cell which includes a plate element having a capacity for prolonged electron emissivity to a plate element of greater potential.

In accordance with the concepts of this invention it is a further object to provide substances that may be formed into plate elements for an electron storage and power cell.

Other objects of this invention will become apparent in view of the drawings and the following description.

In the drawings, forming a part of this application, and in which like parts are designated by like reference numerals throughout the same, FIG. 1 is an exploded view of the various component elements for one embodiment of an electron cell as contemplated by this invention;

FIG. 2 is a longitudinal cross-section of the power cell embodiment shown in FIG. 1 when assembled; and FIG. 3 is a plan layout of the materials forming a wafer plate element, particularly showing the encasing material.

Referring to FIGS. 1 and 2, the novel power cell is essentially composed of plate elements 10 and 11 separated by an insulator disc element 12. These components are held together in a container 13 (including housing 14 and a lid 15) and compressed between an electrically conductive screen grid 16 and an electrically conductive disc spring 17. A neoprene insulating ring 18 separates the housing 14 from the lid 15. To assemble, the elements are fitted into the housing 14 in end to end relation (as shown in the exploded view of FIG. 1); pressure is applied to the lid cover 15 whose rim edge with neoprene ring 18 fitted thereon passes into the enlarged collar 19 of the housing; then the collar 19 is rolled over the rim edge of lid 15 and neoprene ring 18, substantially as shown in FIG. 2.

Plate elements 10 and 11 consist of inner wafer elements 20a and 20b, respectively, formed of substances, which are to be more particularly explained, and an outer encasement of an electrically conductive wrapping 21 including disc-like members 21a and 21b. The wrapping material may be made of a copper gossamer having 146 threads per square inch, and each plate element is tightly wrapped in the wrapping member 21a, whose peripheral edges are folded over disc-like member 21b which is disposed upon the opposite side of the inner wafer element.

Having described the general mechanical arrangement and structure of one electron storage and power cell embodiment, each of its component elements may be more fully described and its function related to the other elements.

Plate element 10 is constructed to act as the positive pole of the power cell. The inner wafer element 20a is made of an electron absorptive substance for collecting or emitting electrons, depending upon whether the cell is being discharged in use or recharged from a D.C. source. An element which is particularly suitable for this purpose is formed from a compressed powdered mixture of selected ingredients including proportioned amounts of silica, carbon, selenium and tantalum. A suitable mixture of these ingredients may be made by taking weight proportions in the following amounts: silica 45, carbon 40, selenium 5, and tantalum 10. The weight proportions of these ingredients may be varied within irregular limits for each stated ingredient. It has been found that barium-oxide may be substituted for selenium in the above mixture but other substitute ingredients are presently unknown.

Plate element 11 serves as the negative pole of the power cell and is also formed of an electron absorptive substance for collecting or emitting electrons. However, in addition, a substance which is suitable to act as the negative pole must have the capacity for prolonging electron emissivity. If otherwise, the action of the cell would be little different than operating as a condenser which characteristically discharges in a matter of a few microseconds. The wafer 20b of plate element 11 which possesses this required capacity may be made from a compressed powdered mixture of certain selected ingredients including proportioned amounts of silica, carbon, selenium, tantalum, copper and nickel. A suitable mixture of these ingredients may be made by taking those ingredients in the following proportions by weight: silica 40, carbon 30, selenium 10, tantalum 5, copper 10, and nickel 5. The proportional presence of these elements can be varied, but in more or less degree for each ingredient. As a substitute for nickel, silver may be used. The degree to which other kinds of ingredients may be substituted has not been determined at this time.

As indicated, the wafer elements 20a and 20b are each formed by molding under pressure, as in forming tablets. In practice the electrically conductive wrapping 21 is applied simultaneously with the mold-forming operation.

The screen grid is used to provide a plurality of electrical contacts over the surface of plate element 10. Each point of wire intersection in the screen places its contacted plate element surface in electrical communication with every other contacted surface of the plate element, as well as the end terminal 22 of housing 14. Such a structure permits of a more uniform charge distribution upon the plate element 10.

Insulation disc 12 may be formed of various substances having differing dielectric constants. Inasmuch, however, as the insulator is to be placed under compression, it is necessary that the insulator be formed from a material which will not easily fracture. Accordingly, a suitable insulating disc may be formed from a fabric pad chemically treated and impregnated with an insulating substance such as neoprene as in a conventional manner. The function of the insulator is, of course, to separate and maintain plate elements 10 and 11 in spaced positions relative to each other.

The spring disc 17 forms an electrical contact between plate element 11 and end terminal 23 of housing 14. Such a disc may be made from a small corrugated disc of spring steel, and oval perforations are provided therein to lend greater resiliency to the spring. When the various component elements are assembled in the manner previously described, the spring forces plate element 11 against the insulator and retains the other elements in a compact assembly having positive electrical contacts between the plate elements and their respective housing terminals.

As an example of performance, and using wafer elements formed by the selection of the stated ingredients in the suggested proportions, a small power cell of one inch diameter and ⅝ inch thickness may be produced which will store a voltage charge of six volts. The wafer elements in such an exemplary construction are approximately ⅞ inch in diameter and have an approximate thickness of 3/32 inch. (FIG. 2 of the drawing illustrates a power cell three times this size.) A plurality of these cells may be unitized by spot welding the positive terminal of one cell to the negative terminal of another cell and in this manner the voltage may be proportionally increased. Thus, four cells connected end to end, plus terminal to negative terminal, will store a voltage charge of 24 volts and deliver a sustained current of two and one-half amperes.

It is to be understood that the form of the invention herewith shown and described is to be taken as a preferred example thereof, and that various changes in the shape, size and arrangement of certain parts may be made without departing from the spirit of the invention or the scope of the attached claims.

Having thus described my invention, what I claim and desire to secure by Letters Patent is:

1. An electron storage and power cell comprising a first element of electron absorptive substance for collecting or emitting electrons, a second element of electron absorptive substance for collecting or emitting electrons, said second element having a capacity for prolonged electron emissivity when negatively charged relative to said first element and conductively interconnected therewith, and an electrical insulating element disposed between and separating said first and second elements.

2. An electron storage and power cell comprising a first element of electron absorptive substance for collecting or emitting electrons, a second element of electron absorptive substance for collecting or emitting electrons, said second element being formed from a powdered mixture including proportioned amounts of silica, carbon, selenium, tantalum, copper and nickel, said mixture having a capacity for prolonged electron emissivity when negatively charged relative to said first element and conductively interconnected therewith, and an electrical insulating element disposed between and separating said first and second elements.

3. An electron storage and power cell comprising a first element of electron absorptive substance for collecting or emitting electrons, a second element of electron absorptive substance for collecting or emitting electrons, said second element being formed from a powdered mixture including amounts of silica, carbon, selenium, tantalum, copper and nickel, said substances being present in quantities proportioned by weight substantially as follows: silica 40, carbon 30, selenium 10, tantalum 5, copper 10, and nickel 5; said mixture having a capacity for prolonged electron emissivity when negatively charged relative to said first element and conductively interconnected therewith, and an electrical insulating element disposed between and separating said first and second elements.

4. An electron storage and power cell comprising a first element of electron absorptive substance for collecting or emitting electrons, a second element of electron absorptive substance for collecting or emitting electrons, said second element being formed from a powdered mixture including proportioned amounts of silica, carbon, selenium, tantalum, copper and silver, said mixture having a capacity for prolonged electron emissivity when negatively charged relative to said first element and conductively interconnected therewith, and an electrical insulating element disposed between and separating said first and second elements.

5. An electron storage and power cell comprising a first element of electron absorptive substance for collecting or emitting electrons, said first element being formed from a powered mixture including proportioned amounts of silica, carbon, selenium and tantalum; a second element of electron absorptive substance for collecting or emitting electrons, said second element being formed from a powdered mixture including proportioned amounts of silica, carbon, selenium, tantalum, copper and nickel, said mixture having a capacity for prolonged electron emissivity when negatively charged relative to said first element and conductively interconnected therewith, and an electrical insulating element disposed between and separating said first and second elements.

6. An electron storage and power cell comprising a first element of electron absorptive substance for collecting or emitting electrons, said first element being formed from a powdered mixture including proportioned amounts of silica, carbon, selenium, and tantalum; a second element of electron absorptive substance for collecting or emitting electrons, said second element being formed from a powdered mixture including proportioned amounts of silica, carbon, selenium, tantalum, copper and silver, said mixture having a capacity for prolonged electron emissivity when negatively charged relative to said first element and conductively interconnected therewith, and an electrical insulating element disposed between and separating said first and second elements.

7. An electron storage and power cell comprising a first element of electron absorptive substance for collecting or emitting electrons, a first wrapping of highly electrical conductive material encasing said first element, a second element of electron absorptive substance for collecting and emitting electrons, said second element having a capacity for prolonged electron emissivity when negatively charged relative to said first element and conductively interconnected therewith, a second wrapping of highly electrical conductive material encasing said second element, and an electrical insulating element disposed between and separating said first and second elements.

8. An electron storage and power cell comprising a housing including a sealed casing having electrically conductive end terminals insulated from each other, said housing containing in end to end relationship between said end terminals: an electrically conductive screen grid providing multiple points of contact, a first element of electron absorptive substance for collecting or emitting electrons, an electrical insulating element, a second element of electron absorptive substance for collecting or emitting electrons, said second element having a capacity for prolonged electron emissivity when negatively charged relative to said first element and conductively interconnected therewith, and an electrical conductive compression spring disposed in abutting contact with said second element and an end terminal.

References Cited in the file of this patent

UNITED STATES PATENTS

| | | |
|---|---|---|
| 2,193,710 | Burnham | Mar. 12, 1940 |
| 2,299,228 | Gray | Oct. 20, 1942 |
| 2,563,307 | Burnham | Aug. 7, 1951 |
| 2,636,062 | Colton | Apr. 21, 1953 |
| 2,800,616 | Becker | July 23, 1957 |
| 2,934,580 | Neumann | Apr. 26, 1960 |